G. A. CULVER.
LAWN MOWER.
APPLICATION FILED NOV. 6, 1907.

911,559.

Patented Feb. 2, 1909.
2 SHEETS—SHEET 1.

Attest:
L. L. Leibrock.
N. W. Winters.

Inventor:
George A. Culver,
By J. C. Sweet, Atty.

G. A. CULVER.
LAWN MOWER.
APPLICATION FILED NOV. 6, 1907.

911,559.

Patented Feb. 2, 1909.
2 SHEETS—SHEET 2.

Attest:
R. L. Leibrock.
N. W. Winters.

Inventor:
George A. Culver,
By J. C. Swert, Atty

UNITED STATES PATENT OFFICE.

GEORGE A. CULVER, OF CLARINDA, IOWA.

LAWN-MOWER.

No. 911,559.  Specification of Letters Patent.  Patented Feb. 2, 1909.

Application filed November 6, 1907. Serial No. 401,337.

*To all whom it may concern:*

Be it known that I, GEORGE A. CULVER, a citizen of the United States of America, and resident of Clarinda, Page county, Iowa, have invented a new and useful Lawn-Mower, of which the following is a specification.

The object of this invention is to provide an improved construction for the cutting mechanism of a lawn mower.

A further object of this invention is to provide improved means for gathering and feeding grass to the cutting mechanism of a lawn mower.

A further object of this invention is to provide an improved construction for rotary cutters.

A further object of this invention is to provide an improved construction for a combined rotary cutter and reel.

A further object of this invention is to provide an improved combination of rotary cutter and reel and a cutter bar in a mower.

A further object of this invention is to provide improved means for mounting cutters on a drive shaft.

My invention consists in the construction, arrangement and combination of elements hereinafter set forth, pointed out in my claims and illustrated by the accompanying drawing, in which—

Figure 1:
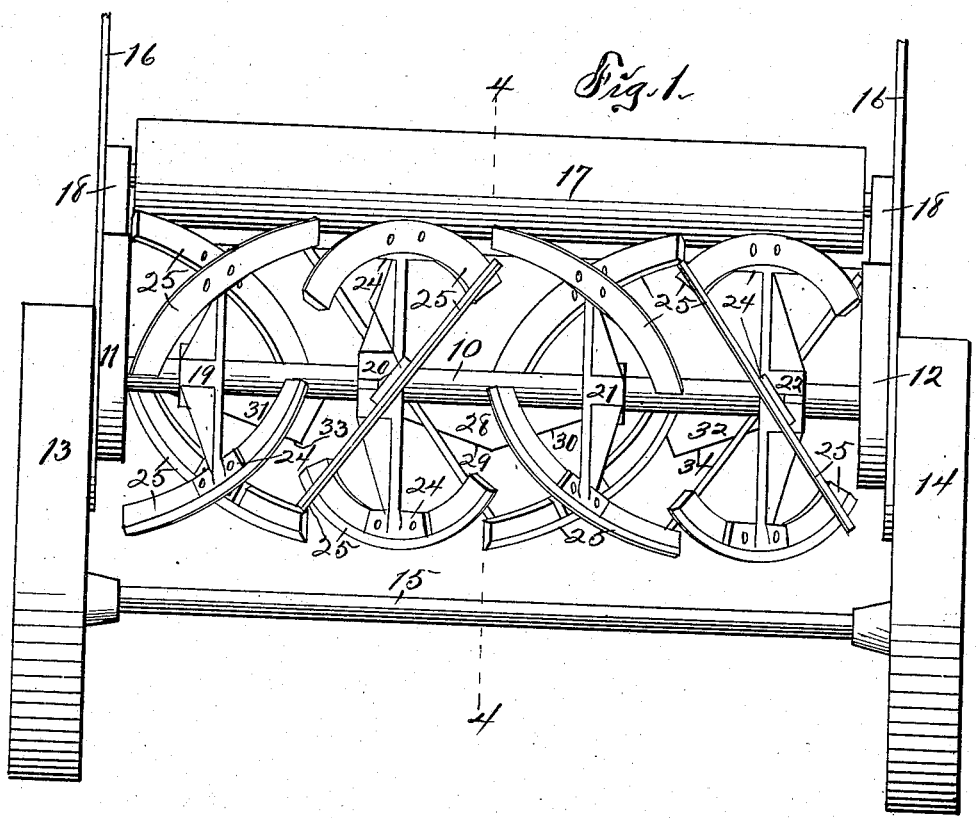
Figure 2:
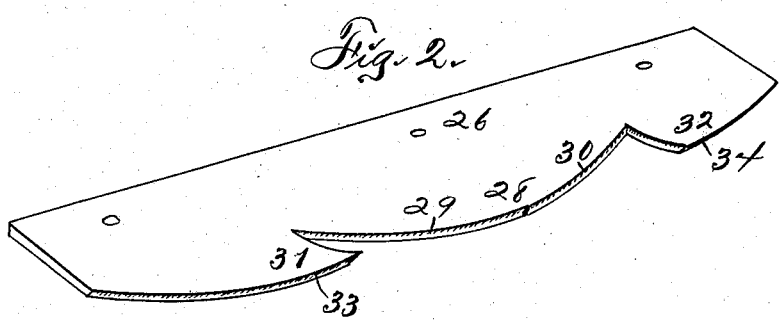
Figure 3:
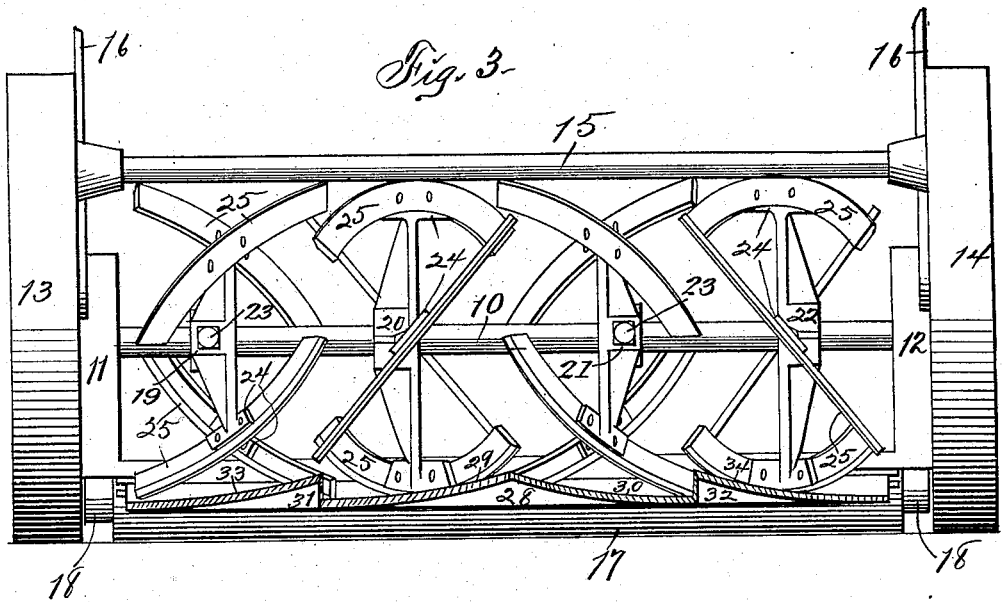
Figure 4:
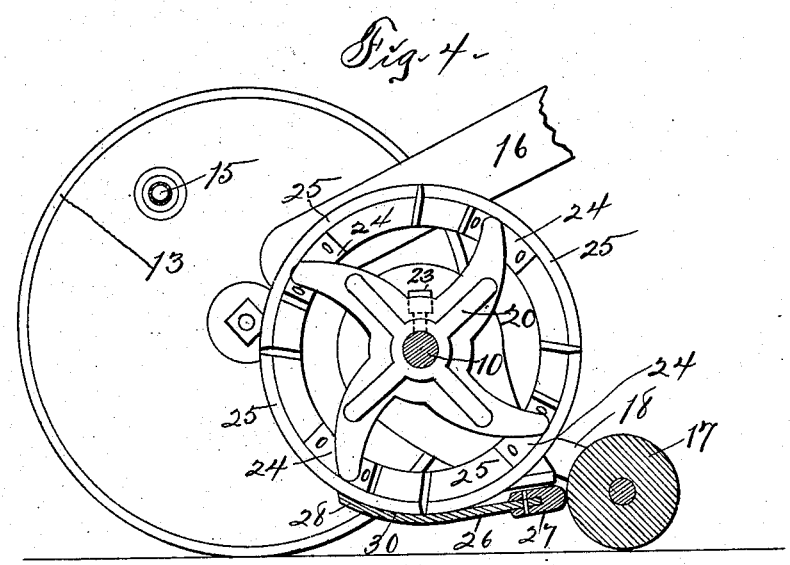

Figure 1 is a plan of the operative portion of a lawn mower embodying my invention. Fig. 2 is a perspective of a cutter bar employed in my improved construction. Fig. 3 is a front elevation of the devices shown in Fig. 1. Fig. 4 is a cross-section on the indicated line 4—4 of Fig. 1.

In the construction hereinafter set forth, no novelty is claimed for the driving mechanism nor the frame of the machine, all of the elements of which are old and may be of any desired and adaptable form. In the construction of lawn mowers it is common to have a drive shaft 10 carry on its ends small gears connected thereto by ratchet mechanism and meshing with interior gears on traction wheels 13, 14. The traction wheels 13, 14 are mounted for rotation on plates 11, 12 fixed to and connected by a cross-bar 15. The housings 11, 12 commonly are connected to a yoke 16 pivotally and said yoke is connected to a handle or other means whereby it may be pushed or drawn over the surface of the ground. It also is common to provide a roller 17 at the rear of and below the shaft 10 and connected by arms 18 loosely to the housings 11, 12.

My invention relates to the cutting mechanism irrespective of the means employed to drive or carry it and may be described as follows: A plurality of spiders, in this instance four in number, 19, 20, 21, 22 are mounted loosely on the shaft 10 between the housings 11, 12. The spiders are alike in construction and may be adjusted longitudinally and circumferentially on the shaft 10. Each of the spiders 19, 20, 21, 22 is provided with a set-screw 23 mounted radially in its hub and adapted to impinge and engage the periphery of the drive shaft 10 and fix the spider thereto at any position within the range of its longitudinal or circumferential adjustment. Cross-heads 24 are formed on the extremities of the arms of each spider. In this instance each spider is provided with four arms and carries four cross-heads. The cross-heads 24 are arranged obliquely to the orbit of the extremities of the arms and also obliquely to the trend of the drive shaft 10. Cutters 25 are fixed to the cross-heads 24, one cutter for each cross-head. Since each spider carries four cross-heads, it would carry four cutters. Each of the cutters is curved on the arc of an ellipse greater than the orbit of the cutting edges thereof. Each of the cutters is of a length greater than one quarter of the orbit described by the cutting edges thereof and the outer edge thereof is beveled and sharpened to form such cutting edge. Since the cross-heads 24 are set obliquely to the arms of the spiders and also to the trend of the drive shaft 10, it follows that the cutters 25 are also obliquely positioned, but have all points on their cutting edges equidistant from said shaft. The spiders 19, 20, are set in such position that the cross-heads thereon are directed oppositely to the cross-heads of the spiders 21, 22, thus arranging the cutters carried by the spiders 19, 20 opposite to the cutters carried by the spiders 21, 22. This arrangement provides for the cutting effect or side draft of the cutters on one side of the center of the machine being directed laterally toward the center of the machine while those on the opposite side of the center are likewise directed toward the same point. Thus the side draft of the cutters on the spiders 19, 20 is opposed and counterbalanced by the side draft of the cutters on the spiders 21, 22 when all of the cutters are in use. Furthermore, the various spiders are circumferentially adjusted on the drive shaft 10 in such manner that ends of adjacent cutters slightly overlap in order that all of a swath of a given width may be cut simultaneously. A cutter bar 26 is mounted on a suitable support 27 carried by the frame of the machine and extends forward beneath the rotary cutting devices. The cutter bar 27 preferably is formed of a steel plate concavo-convex in cross-section. At the center of the forward margin of the cutter bar 26 a tooth 28 is formed, which tooth has its apex at the center of the bar and has its edges extending in opposite directions therefrom downwardly and rearwardly. Cutting edges 29, 30 of the cutter bar 26 preferably are of a length coincident with the swath or effective width of a rotary cutter (composed of spider, cross-heads and four cutters 25 thereon) and, therefore, the combined cutting edges of the tooth 28 approximate in length to the combined swath of two rotary cutters. Other teeth 31, 32, are formed on the forward margin of the cutter bar 26 and have their cutting edges extending rearwardly and outwardly. The cutting edges 33, 34 of the teeth 31, 32 are opposite each other and of a length approximating to the swath or cutting area of a rotary cutter. The cutting edges 29, 30, 33 and 34 are set in arcs approximating closely to the extreme orbit of the cutting edges of the cutters 25 and in conjunction with said cutters provide for "shear-cutting" any substance received between them.

In practical use of a lawn mower of the construction as described, the machine is advanced over the surface to be trimmed or mowed. The drive shaft 10 is rotated in the advance of the machine and revolves the spiders in such manner as to cause the cutters 25 to advance into, comb, grasp, engage and direct grass or similar vegetable growth into contact with the cutting edges of the cutter bar 26 to the end that the grass thus gathered, combed, engaged and drawn into contact with the cutter bar is severed at the point of approximation of the edges of the cutters 25 with the forward edges of the cutter bar. In this connection it may be stated that the cutting edge of the cutter bar may be square or beveled to any desired degree and the cutting edges of the cutters 25 may be square or beveled to any desired degree. Again, either or both of the edges of the cutter bar and cutters may be attenuated or square but the best results are obtainable when all of the cutting edges are sharply beveled as tending to facilitate severing the vegetable fibers by transverse cuts.

I claim as my invention—

1. In a lawn mower, a drive shaft, a plurality of spiders thereon, cross-heads on the ends of the arms of the spiders, and cutters mounted on said cross-heads, each cutter curved on the arc of an ellipse, each of said cutters overlapping two adjacent cutters.

2. In a lawn mower, a drive shaft, a spider thereon and cutters carried by said spider, each of said cutters having cutting edges on the arc of an ellipse, each of said cutters exceeding in length one quarter of the circle described by the orbit of said cutting edges, end portions of said cutters overlapping and spaced apart.

3. In a lawn mower, a drive shaft, a spider thereon, cutters carried by said spider, each of said cutters formed with a cutting edge on the arc of an ellipse, each of said cutters exceeding in length one-quarter of the circle described by the orbit of the cutting edge thereof, and a cutter bar formed with a cutting edge adjacent the orbit of the cutters.

Signed by me at Des Moines, Iowa, this eleventh day of June, 1907.

GEORGE A. CULVER.

Witnesses:
S. C. SWEET,
THOMAS G. ORWIG.